US012515587B2

(12) United States Patent
Otsuka

(10) Patent No.: US 12,515,587 B2
(45) Date of Patent: Jan. 6, 2026

(54) MIRROR POSITION REGISTRATION CONTROL APPARATUS

(71) Applicant: SUBARU CORPORATION, Tokyo (JP)

(72) Inventor: Yusuke Otsuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 17/947,917

(22) Filed: Sep. 19, 2022

(65) Prior Publication Data

US 2023/0095614 A1 Mar. 30, 2023

(30) Foreign Application Priority Data

Sep. 29, 2021 (JP) .................................. 2021-159753

(51) Int. Cl.
*B60R 1/07* (2006.01)
*B60K 35/10* (2024.01)
(Continued)

(52) U.S. Cl.
CPC ................ *B60R 1/07* (2013.01); *B60K 35/10* (2024.01); *B60K 35/22* (2024.01); *B60R 1/04* (2013.01);
(Continued)

(58) Field of Classification Search
CPC ....... B60R 1/07; B60R 1/04; B60K 2360/172; B60K 35/29; B60W 2510/1005; B60W 2050/146; B60W 50/14; G09G 3/36
See application file for complete search history.

(56) References Cited

U.S. PATENT DOCUMENTS

2005/0159862 A1* 7/2005 Komori .................. G01C 21/26
701/49
2011/0045813 A1* 2/2011 Choi ................... H04M 1/7243
345/82
(Continued)

FOREIGN PATENT DOCUMENTS

JP 2003-95067 A 4/2003
JP 2006-335249 A 12/2006
(Continued)

OTHER PUBLICATIONS

Office Action issued in Japanese Patent Application No. 2021-159753 dated Apr. 22, 2025.

*Primary Examiner* — Toya Pettiegrew
(74) *Attorney, Agent, or Firm* — TROUTMAN PEPPER LOCKE LLP

(57) ABSTRACT

A mirror position registration control apparatus includes a shift position detector that detects a shift position of a vehicle, a mirror surface position detector that detects a change in a mirror surface position in the vehicle, a mirror surface position storage that stores a set mirror surface position; an information display that displays information for a driver who drives the vehicle, a registration operation receiver that receives a registration operation for the mirror surface position inputted by the driver, and a processor that, in a case where the mirror surface position is changed with the shift position set at a reverse position, displays a registration screen for the changed mirror surface position on the information display and stores the changed mirror surface position in the mirror surface position storage on the basis of the registration operation when the shift position is changed from the reverse position to a parking position.

16 Claims, 11 Drawing Sheets

(51) Int. Cl.
  *B60K 35/22*   (2024.01)
  *B60R 1/04*    (2006.01)
  *B60W 50/14*   (2020.01)
  *G09G 3/36*    (2006.01)
(52) U.S. Cl.
  CPC ............... *B60W 50/14* (2013.01); *G09G 3/36* (2013.01); *B60W 2050/146* (2013.01); *B60W 2510/1005* (2013.01); *B60W 2540/215* (2020.02); *G09G 2380/10* (2013.01)

(56) References Cited

U.S. PATENT DOCUMENTS

| | | | | |
|---|---|---|---|---|
| 2012/0162427 | A1* | 6/2012 | Lynam | B62D 15/0295 |
| | | | | 348/148 |
| 2012/0162798 | A1* | 6/2012 | Takemasa | B60R 1/074 |
| | | | | 359/877 |
| 2014/0347488 | A1* | 11/2014 | Tazaki | B60R 1/04 |
| | | | | 348/148 |
| 2018/0105109 | A1* | 4/2018 | Miyazaki | G02B 7/1821 |
| 2018/0166047 | A1 | 6/2018 | Yamazato | |
| 2019/0152349 | A1* | 5/2019 | Perkins | B60K 35/658 |
| 2020/0081608 | A1 | 3/2020 | Yamamoto et al. | |
| 2021/0188177 | A1* | 6/2021 | Egashira | B60R 1/26 |

FOREIGN PATENT DOCUMENTS

| | | |
|---|---|---|
| JP | 2007-45217 A | 2/2007 |
| JP | 2012-148601 A | 8/2012 |
| JP | 2016-008175 A | 5/2016 |
| JP | 2018-094986 A | 6/2018 |
| JP | 2018-142760 A | 9/2018 |
| JP | 2020-042417 A | 3/2020 |
| WO | WO-2016101201 A1 * | 6/2016 |

* cited by examiner

MIRROR POSITION REGISTRATION CONTROL APPARATUS

CROSS-REFERENCE TO RELATED APPLICATION

The present application claims priority from Japanese Patent Application No. 2021-159753 filed on Sep. 29, 2021, the entire contents of which are hereby incorporated by reference.

BACKGROUND

The technology relates to a mirror position registration control apparatus.

Vehicles such as automobiles are provided with rear-view mirror devices such as door mirrors or fender mirrors. Operating switches in the vehicles allows the mirror surfaces of these rear-view mirror devices to be changed to have appropriate angles.

In addition, an appropriate angle of the mirror surface to be set when a vehicle is moved backward into a garage is different from an appropriate angle of the mirror surface to be set when the vehicle is normally driven. In one example, when a vehicle is put into the garage, a slightly lower area including the area near the rear wheels is monitored rather than the area right behind the vehicle. Some vehicles are thus provided with mechanisms each of which automatically moves a mirror surface downwardly by a preset angle in a case where the transmission is shifted into the reverse gear and upwardly moves the mirror surface back to the original angle in a case where the transmission is shifted from the reverse gear to another gear such as the drive position. Hereinafter, traveling with the transmission shifted into the reverse gear is referred to as "reverse traveling", and traveling with the transmission shifted from the reverse gear to another gear is referred to as "non-reverse traveling".

SUMMARY

An aspect of the technology provides a mirror position registration control apparatus to be applied to a vehicle. The mirror position registration control apparatus includes a shift position detector, a mirror surface position detector, a mirror surface position storage, an information display, a registration operation receiver, and a processor. The shift position detector is configured to detect a shift position of the vehicle. The mirror surface position detector is configured to detect a change in a mirror surface position in the vehicle. The mirror surface position storage is configured to store a set mirror surface position. The information display is configured to display information for a driver who drives the vehicle. The registration operation receiver is configured to receive a registration operation for the mirror surface position. The registration operation is inputted by the driver. In a case where the mirror surface position is changed with the shift position set at a reverse position, the processor is configured to display a registration screen for the changed mirror surface position on the information display and store the changed mirror surface position in the mirror surface position storage on the basis of the registration operation when the shift position is changed from the reverse position to a parking position.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
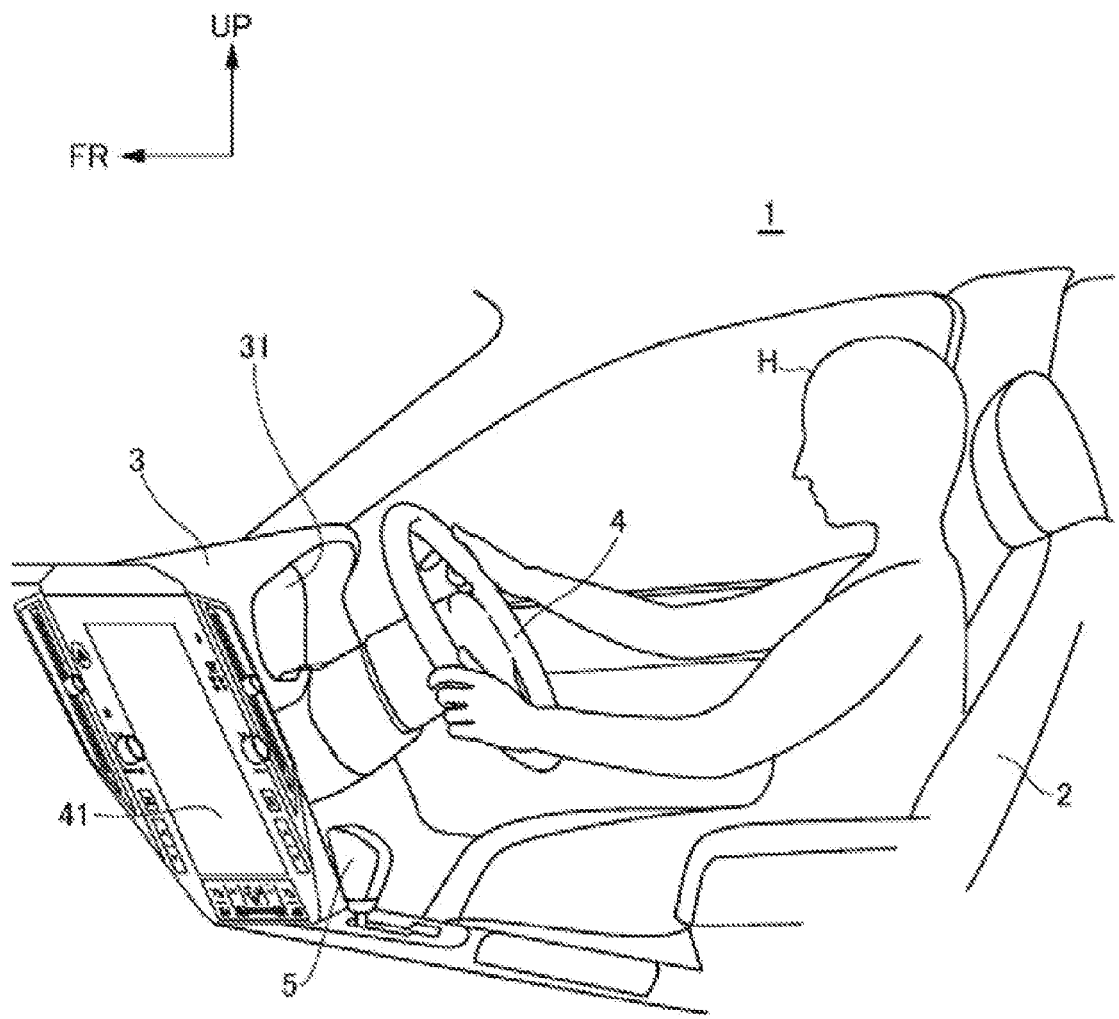
FIG. 1 is a perspective view of a vehicle compartment of a vehicle according to one example embodiment of the technology.

It is common that one vehicle is driven by several members of a family. In contrast, it is rare that, for example, a company exclusively assigns the company's business cars to the respective employees. One vehicle may be shared and used by several employees in most cases. In a situation in which a plurality of drivers drives the same vehicle, a driver may thus have to adjust the angle of a mirror for the vehicle whenever the driver begins to drive the vehicle. It is therefore proposed that a mirror surface position be registered for each of drivers, a seat position or the positions of the eyes of the driver be detected, and the mirror surface position be automatically changed to be adapted to the driver. For example, reference are made to Japanese Unexamined Patent Application Publication (JP-A) No. 2003-095067 and JP-A No. 2007-045217.

Even the same driver sometimes has a request to register a plurality of mirror surface positions. In one example, in the case of reverse traveling, desirable mirror angles are different in some cases depending on places, time slots, and the like. For example, desirable mirror angles are different in some cases depending on different parking places including a parking space at the house, a shopping mall, and the like. Further, desirable mirror angles are different in some cases, for example, depending on the angle of sunlight, the angle of a light that is turned on in accordance with a time slot, and the like. Meanwhile, the driver feels uncomfortable with being forced to carry out complicated work to register the angle of a mirror again after adjusting the angle of the mirror, failing in registering the angle of a mirror because predetermined work is forgotten, or automatic registration of a new mirror angle whenever adjusting the angle of a mirror.

It is desirable to provide a mirror position registration control apparatus that makes it possible to increase the convenience of adjusting a mirror position without requesting any complicated work whenever the mirror position is adjusted.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 2:
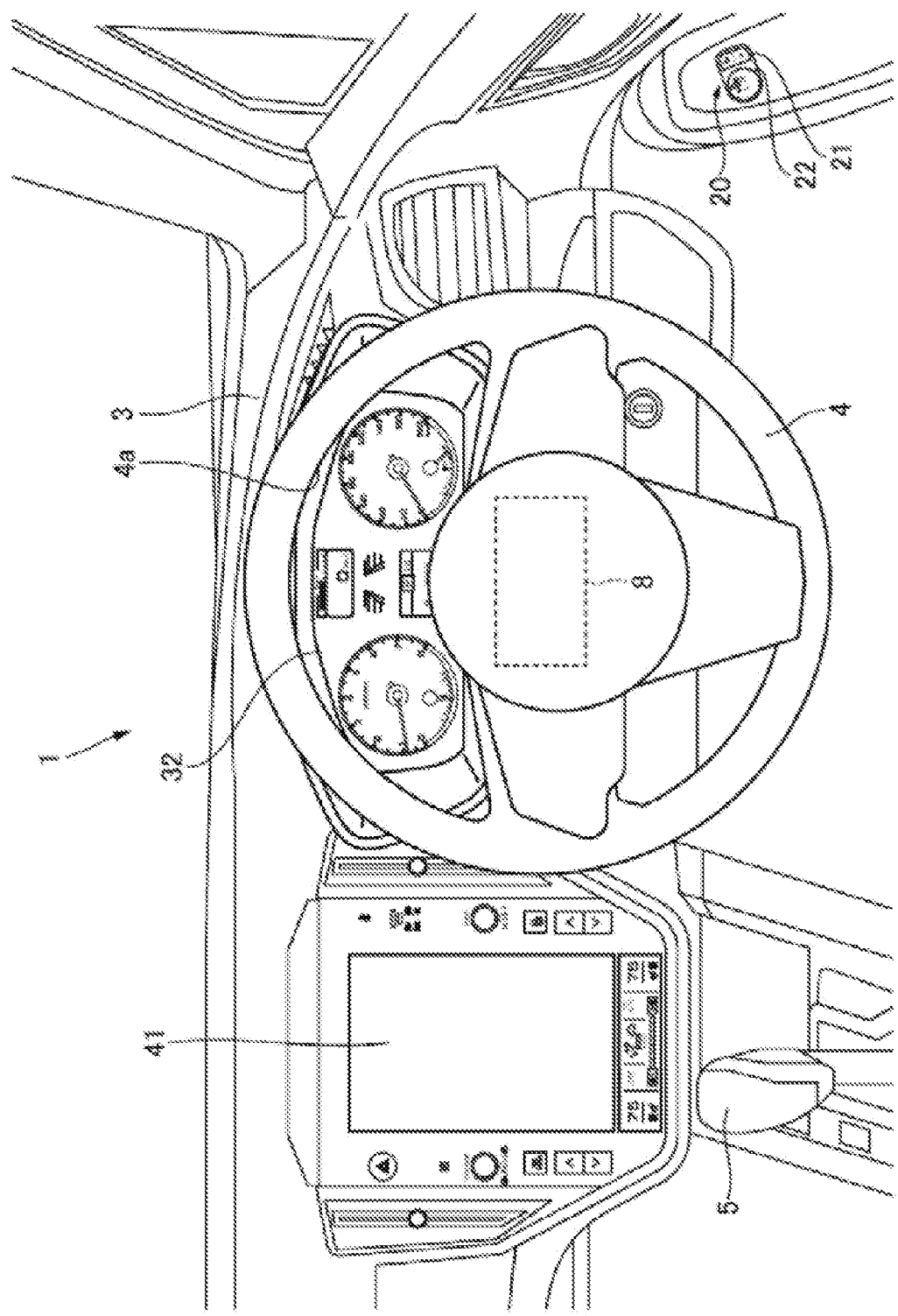
FIG. 2 is a front view of an area in front of a driver's seat in the vehicle compartment.

As illustrated in FIGS. 1 and 2, a vehicle 1 may include an instrument panel 3, a steering wheel 4, and a shift lever 5. The instrument panel 3 may be provided in front of a driver's seat 2 on the front side of the vehicle 1. The steering wheel 4 may be disposed between the driver's seat 2 and the instrument panel 3. The shift lever 5 may be provided at the front of the side of the driver's seat 2 closer to the passenger seat.

The steering wheel 4 may be rotatably attached to an unillustrated steering column with an unillustrated steering shaft interposed in between. In addition, an airbag 8 may be stored inside the steering wheel 4. The airbag 8 may inflate against a driver when the vehicle 1 has a collision or the like. Hereinafter, the driver may be referred to as driver H.

The shift lever 5 may be a switching device or a shift device for allowing the driver H to select a traveling state and switch traveling states of the vehicle 1 by an operation. In the example embodiment, the shift lever 5 may be configured to switch between ranges including a parking range P, a neutral range N, a drive range D, and a reverse range R. The parking range P may also be referred to as parking position. The neutral range N may also be referred to as neutral position. The drive range D may also be referred to as traveling position. The reverse range R may also be referred to as reverse position. Alternatively, the shift device may also be a column shift provided on a side of the steering wheel 4 or a button shift without a lever.

Figure 3:
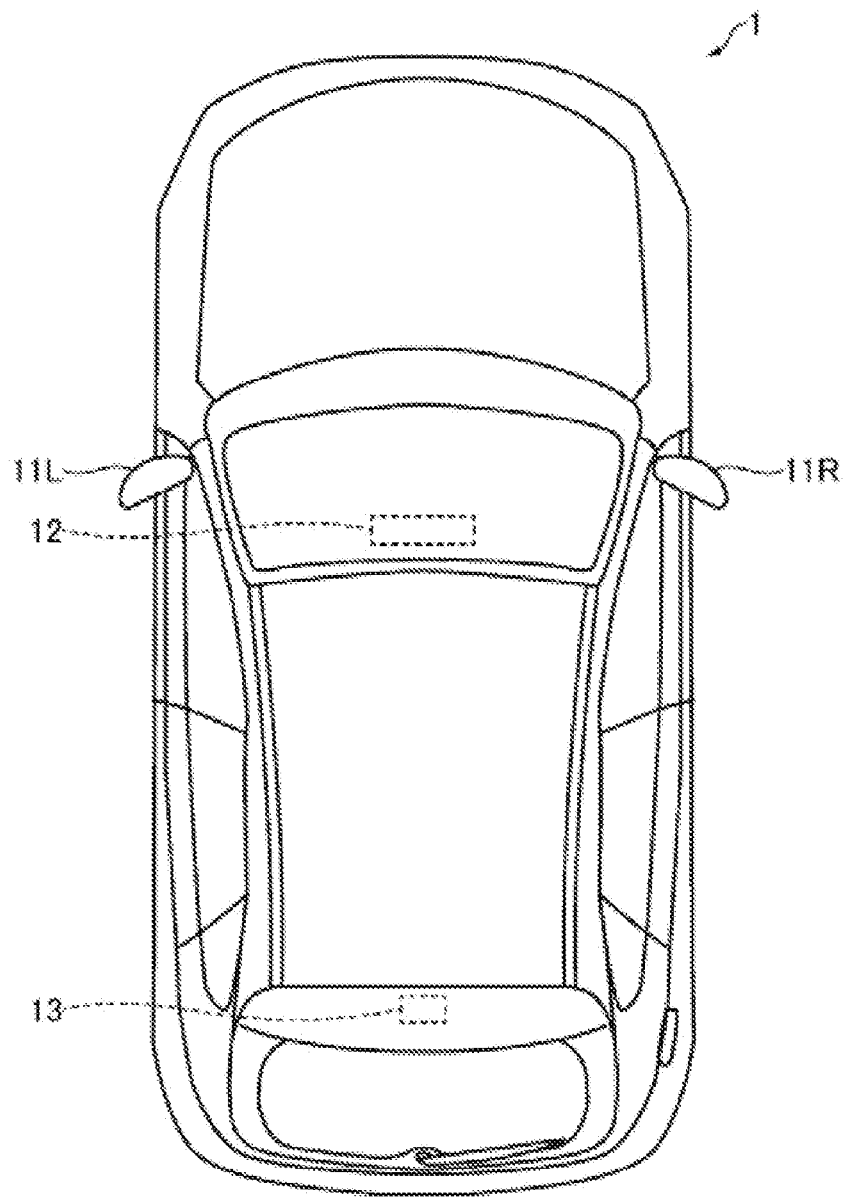
FIG. 3 is a plan view of the vehicle for describing a mirror.

As illustrated in FIG. 3, the vehicle 1 may include door mirrors 11L and 11R, a rear-view mirror 12, and a rear camera 13. The rear camera 13 may image the area behind the vehicle 1. An image shot by the rear camera 13 may be displayed on a middle information display panel 41 described below.

In the example embodiment, changing a mirror surface position is not limited to changing the mirror surface position of the door mirror 11L or 11R or the rear-view mirror 12 and may also include changing the position or the direction of the rear camera 13 for imaging. In addition, in the example embodiment, only the rear camera 13 that images the area behind the vehicle 1 may be used as a camera that images the area around the vehicle 1. However, a front camera, a side camera, or other cameras may also be used. The front camera may image the area in front of the vehicle 1. The side camera may image the area on a side of the vehicle 1.

In the example embodiment, the mirror surface positions of all the door mirrors 11L and 11R, the rear-view mirror 12, and the rear camera 13 may be registered as the registration of mirror surface positions. This is not, however, limitative. The mirror surface position of any one of the door mirror 11L or 11R, the rear-view mirror 12, or the rear camera 13 may be registered. Alternatively, not all the mirror surface positions, but a plurality of predetermined mirror surface positions may be registered. For example, the position of the rear-view mirror 12 may be manually adjusted, excluding the rear-view mirror 12 from targets of the registration or automatic adjustment of the mirror surface positions.

As illustrated in FIG. 2, the driver's door may include a door mirror operation switch 20. In one embodiment, the door mirror operation switch 20 may serve as a mirror operation receiver. The door mirror operation switch 20 may include a door mirror storage switch 21 and a mirror surface adjustment switch 22.

The door mirror storage switch 21 may receive an operation instruction to fold and store the door mirror 11L or 11R. In addition, the door mirror storage switch 21 may also receive an operation instruction to restore the stored door mirror 11L or 11R. The mirror surface adjustment switch 22 may receive an operation instruction to change the mirror surface position of the door mirror 11L or 11R. Selecting either one of the door mirrors 11L and 11R and pushing down the upper, lower, left, and right portions of the mirror surface adjustment switch 22 allow the mirror surface adjustment switch 22 to receive the operation instruction. This allows the mirror surface adjustment switch 22 to receive the upper, lower, left, and right adjustment angles of the mirror surface of either one of the door mirrors 11L and 11R that is selected.

Figure 4:
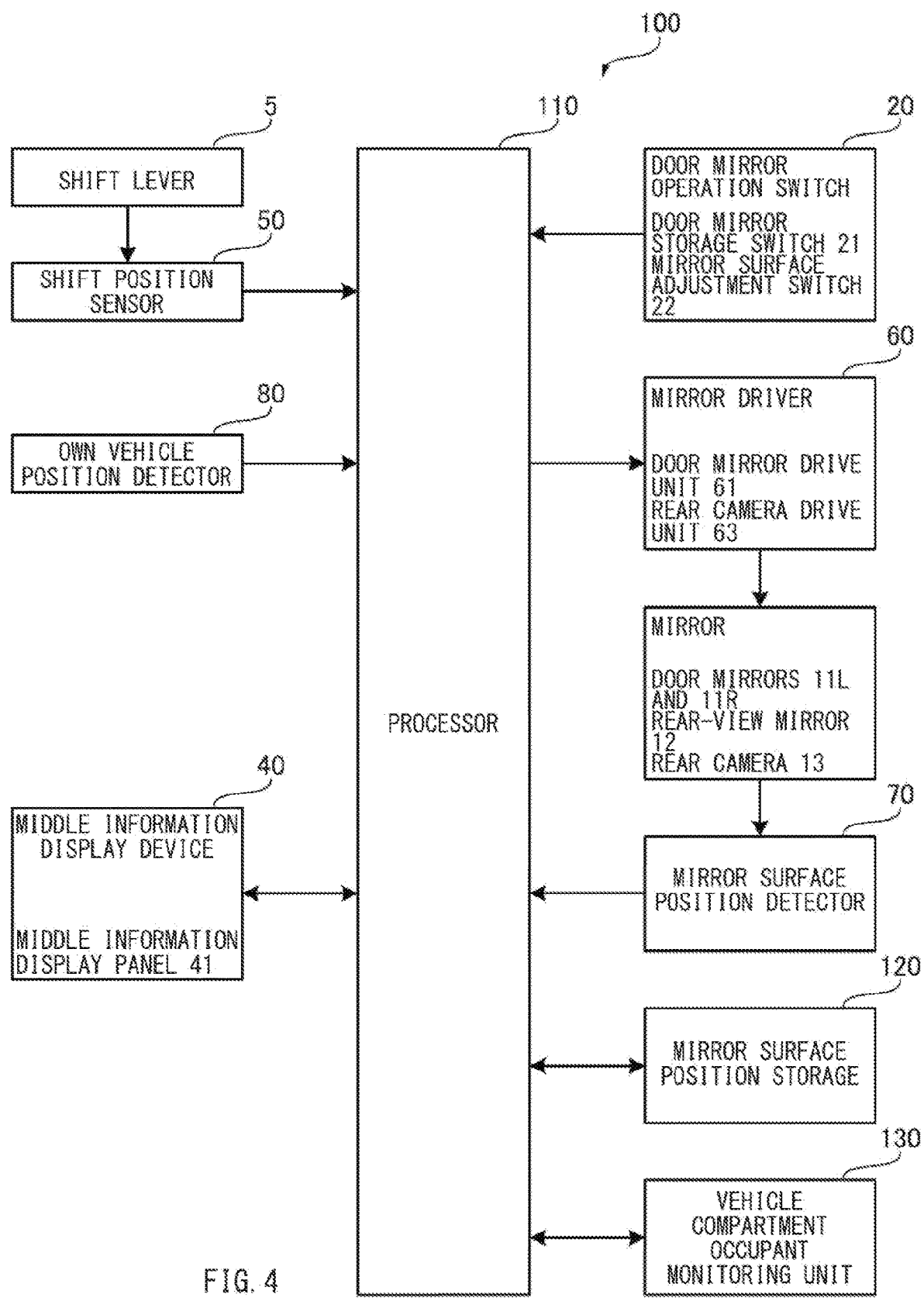
FIG. 4 is a block diagram of a mirror position registration control apparatus according to one example embodiment of the technology.

In a case where the door mirror storage switch 21 and the mirror surface adjustment switch 22 receive operation instructions, a door mirror drive unit 61, which is illustrated in FIG. 4, may store or restore either one of the door mirrors 11L and 11R that is selected or change the mirror surface position thereof.

Operating the door mirror storage switch 21 and the mirror surface adjustment switch 22 of the door mirror operation switch 20 in this way allows the driver H to perform manual operations such as storing the door mirror 11L or 11R and changing the mirror surface position thereof even while sitting on the driver's seat.

As illustrated in FIG. 1, the vehicle 1 may also include an instrument display panel 31 and the middle information display panel 41 in the vehicle compartment. The instrument display panel 31 may be disposed in the instrument panel 3 on the front side of the driver's seat 2. The middle information display panel 41 may be disposed on the side of the driver's seat 2 closer to the passenger seat. In other words, the middle information display panel 41 may be disposed in the instrument panel 3 closer to the middle of the vehicle 1 as viewed from the width direction.

As illustrated in FIGS. 1 and 2, the instrument display panel 31 may include a pointer meter and a so-called liquid crystal display. The pointer meter may be configured like an analog clock. In the liquid crystal display, a liquid crystal panel and a backlight may be integrally provided. Various kinds of information displayed on a first display region 32 of the instrument display panel 31 may be visible to the driver H through an upper space 4a of the steering wheel 4.

As illustrated in FIG. 2, the instrument display panel 31 may be provided with the first display region 32. Two pointer meters that indicate various pieces of information may be disposed on the left and right of this first display region 32. Examples of the two pointer meters may include a speedometer that indicates the traveling speed of the vehicle 1 and a tachometer that indicates the rotation speed of the engine per unit time. A small liquid crystal display may be disposed in the middle of the instrument display panel 31 between the two pointer meters. The small liquid crystal display may display an image that represents general vehicle information. Alternatively, the instrument display panel 31 may include one liquid crystal display as a whole in place of the pointer meters.

The middle information display panel 41 may include, for example, a so-called liquid crystal display in which a liquid crystal panel and a backlight are integrally provided. In addition, the middle information display panel 41 may display an image shot by the rear camera 13 as described above. This makes it possible to monitor the area behind the vehicle 1 on the display screen.

The middle information display panel 41 displays various kinds of information for the driver H. The middle information display panel 41 may be a touch panel configured to receive an operation inputted by the driver H. For example, the middle information display panel 41 receives a registration operation for a mirror surface position inputted by the driver H. In one embodiment, the middle information display panel 41 may serve as an "information display" that displays information for the driver H and a "registration operation receiver" that receives a registration operation for a mirror surface position inputted by the driver H.

Further, the middle information display panel 41 may also be configured to receive a changing instruction to change the imaging direction or the imaging range of the rear camera 13 by an operation of the driver H. In a case where the middle information display panel 41 receives the changing instruction to change the imaging direction of the rear camera 13, a rear camera drive unit 63, which is illustrated in FIG. 4, may change the imaging direction or the imaging range of the rear camera 13.

The middle information display panel 41 may also display map information or other information. That is, the middle information display panel 41 may also serve as a so-called car navigation system. The middle information display panel 41 may be provided to a middle information display device 40. The middle information display device 40 may include various components including operation buttons around the middle information display panel 41. These operation buttons may be used to operate an acoustic device, an air conditioner, or other devices. These buttons provided to the middle information display device 40 may receive operations inputted to the middle information display panel 41 as a touch panel by the driver H.

Alternatively, each of the liquid crystal displays included in the instrument display panel 31 and the middle information display panel 41 may also include a self-luminous display device such as a plasma display or organic EL or a projection display device such as a projector.

Next, a configuration of a mirror position registration control apparatus 100 according to the example embodiment is described with reference to the block diagram of FIG. 4.

As illustrated in FIG. 4, the mirror position registration control apparatus 100 may include the middle information display device 40, a shift position sensor 50, a mirror driver 60, a mirror surface position detector 70, an own vehicle position detector 80, a processor 110, a mirror surface position storage 120, and a vehicle compartment occupant monitoring unit 130.

The shift position sensor 50 may be a sensor for detecting where the shift range or the shift position of the vehicle 1 is set. In other words, the shift position sensor 50 may detect a switching position of the shift lever 5. The shift position sensor 50 may detect at which position the shift range is set such as the parking range P, the drive range D, the reverse range R, or the neutral range N. The shift range detected by the shift position sensor 50 may be inputted to the processor 110. The current shift range may be stored in the RAM of the processor 110. This allows the processor 110 to recognize where the shift range is set. In one embodiment, the shift position sensor 50 may serve as a "shift position detector".

The mirror driver 60 may change the mirror surface position of each of the mirrors. The mirror driver 60 may include the door mirror drive unit 61 and the rear camera drive unit 63.

The door mirror drive unit 61 may store and restore the door mirror 11L or the door mirror 11R and change the mirror surface position of the door mirror 11L or the door mirror 11R. In one example, the door mirror drive unit 61 may store or restore the door mirror 11L or 11R in a case where the door mirror storage switch 21 is operated. In a case where the mirror surface adjustment switch 22 is operated, the door mirror drive unit 61 may change the mirror surface position of either one of the door mirrors 11L and 11R that is selected in accordance with how much the mirror surface adjustment switch 22 is operated.

The rear camera drive unit 63 may change the imaging position or direction of the rear camera 13. In one example, in a case where the middle information display panel 41 receives a changing instruction to change the imaging direction of the rear camera 13, the imaging position or direction of the rear camera 13 may be changed in accordance with the received changing instruction.

The mirror surface position detector 70 detects a change in the mirror surface position of the door mirror 11L or 11R or the rear-view mirror 12 and a change in the imaging direction or the imaging range of the rear camera 13. For example, the mirror surface position detector 70 may detect a change in mirror surface position in a case where the door mirror operation switch 20 is operated or the changing instruction to change the imaging direction or the imaging range of the rear camera 13 is inputted.

In one embodiment, the own vehicle position detector 80 may serve as a "vehicle position detector". The vehicle position detector may detect the current position of the vehicle 1. For example, the own vehicle position detector 80 may include a GPS receiver. The own vehicle position detector 80 may detect the current position of the vehicle 1 on the basis of received GPS signals. Alternatively, the own vehicle position detector 80 may use the GPS or the own vehicle position detection system of a car navigation system.

The processor 110 may include unillustrated CPU, ROM, RAM, EEPROM, and input/output ports. Examples of the RAM may include a ring buffer. For example, in a case where information is inputted from the input port, the processor 110 may control various devices through the output port on the basis of a control program read out from the ROM.

It is to be noted that the ROM of the processor 110 may store a program for a mirror position control process described below. For example, triggered by an operation of opening a door, the CPU of the processor 110 may develop a program for the mirror position control process in the RAM and begin the mirror position control process as described below. For example, an operation of unlocking a door or turning on the ignition may be used as a trigger.

For example, in a case where a mirror surface position is changed with the shift position set at the shift position for reverse traveling, the processor 110 displays a registration screen for the changed mirror surface position on the middle information display panel 41 in the mirror position control process when the shift position is changed from the reverse position to the parking position. The processor 110 stores the changed mirror surface position in the mirror surface position storage 120 on the basis of a registration operation.

The processor 110 may store a changed mirror surface position for each of places of the vehicle 1 in the mirror surface position storage 120. The places may be each based on a position detected by the own vehicle position detector 80. Further, in a case where a mirror surface position is changed a predetermined number of times or more in a predetermined place, the processor 110 may display a registration screen on the middle information display panel 41. In the example embodiment, in a case where a mirror surface position is changed three times or more, the processor 110 may display a registration screen on the middle information display panel 41. In a case where a predetermined time passes with no registration operation performed after the registration screen is displayed, the processor 110 may perform a process of hiding the displayed registration screen. The processor 110 may perform a process such as displaying a registration screen on the middle information display panel 41 in a case where the ignition is turned off after the shift position is changed from the reverse position to the parking position.

The mirror surface position storage 120 may be a storage that stores the set mirror surface position. In one example, the mirror surface position storage 120 may store, for each of registered users, information regarding the respective mirror surface positions for normal or non-reverse traveling and information regarding the respective mirror surface positions for each of places in which reverse traveling is to be taken place. The mirror surface position storage 120 may also store a default position or an initial setting position as a standard mirror surface position. The standard mirror surface position may be independent from the registered users. Further, the mirror surface position storage 120 may store, for example, a registration candidate position of a place for which a mirror surface position is stored and the designated number of changes in mirror surface position at this position. It is to be noted that the mirror surface position storage 120 may use a portion of the EEPROM of the processor 110.

The vehicle compartment occupant monitoring unit 130 may detect, for example, the condition of an occupant in the vehicle compartment by causing a vehicle compartment occupant monitoring system to process an image captured by an unillustrated camera in the vehicle compartment (hereinafter referred to as vehicle interior camera) that images an occupant in the vehicle compartment. The occupant in the vehicle compartment may include the driver H and another occupant.

The vehicle compartment occupant monitoring system may perform a predetermined process, for example, on data on the image captured by the vehicle interior camera. The vehicle compartment occupant monitoring system may be configured to recognize the condition of the driver H in real time. For example, the vehicle compartment occupant monitoring system may recognize distraction or wakefulness of the driver H by detecting the movement of the head, the eyelid opening degree, the gazing direction, or the blinking rate of the driver H. This makes it possible to issue a warning or take preventive measures at an appropriate timing.

The vehicle compartment occupant monitoring system may be configured to recognize the driver H registered in advance by using, for example, a face recognition function. This makes it possible to automatically adjust, for example, the position of a seat or a mirror or the temperature in the vehicle at the registered setting value in a case where the registered driver H gets into the vehicle 1.

The vehicle interior camera may be disposed to include all the seats in the visual field. The vehicle compartment occupant monitoring system may increase safety for an occupant by monitoring the environment of the whole vehicle compartment in real time. In one example, the vehicle compartment occupant monitoring system may increase safety and comfortability for an occupant by counting the number of occupants in the vehicle compartment, recognizing an occupant, or analyzing the posture of an occupant. For example, the vehicle compartment occupant monitoring system may be configured to adjust the operation of an airbag in real time in accordance with the size or the position of an occupant. The vehicle compartment occupant monitoring system may also be configured to warn a specific occupant who is erroneously wearing a seat belt. Alternatively, the vehicle compartment occupant monitoring system may be configured to adapt the environment in the vehicle to the current number of occupants.

The vehicle compartment occupant monitoring system may acquire information, for example, from an unillustrated steering angle sensor in place of the vehicle interior camera. In this case, the vehicle compartment occupant monitoring system may analyze the steering behavior of the driver H at the wheel from the information received by the steering angle sensor. The vehicle compartment occupant monitoring system may be configured to grasp the fatigue level of the driver H and perform, for example, a process of prompting the driver H to take a rest.

A control program for the vehicle compartment occupant monitoring system may be stored in the ROM of the processor 110 and the CPU of the processor 110 may perform the process. Alternatively, the vehicle compartment occupant monitoring system may be a driver monitoring system that monitors only the driver H. The vehicle interior camera is not limited to a vehicle interior camera dedicated to the vehicle compartment occupant monitoring unit 130. Alternatively, a camera in the vehicle compartment that is used, for example, by a driving recorder may also serve as the vehicle interior camera.

Next, the mirror position control process of the mirror position registration control apparatus 100 is described. The program for the mirror position control process may be stored in the ROM of the processor 110 as described above. In a case where an occupant gets into the vehicle 1 after an operation of opening a door, the program may be developed in the RAM of the processor 110, causing the CPU of the processor 110 to begin the mirror position control process. Alternatively, the mirror position control process may be begun, for example, by an operation of unlocking a door of the vehicle 1. In this case, for example, the process of identifying the driver H may be performed whenever an occupant gets into the vehicle 1.

Figure 5:
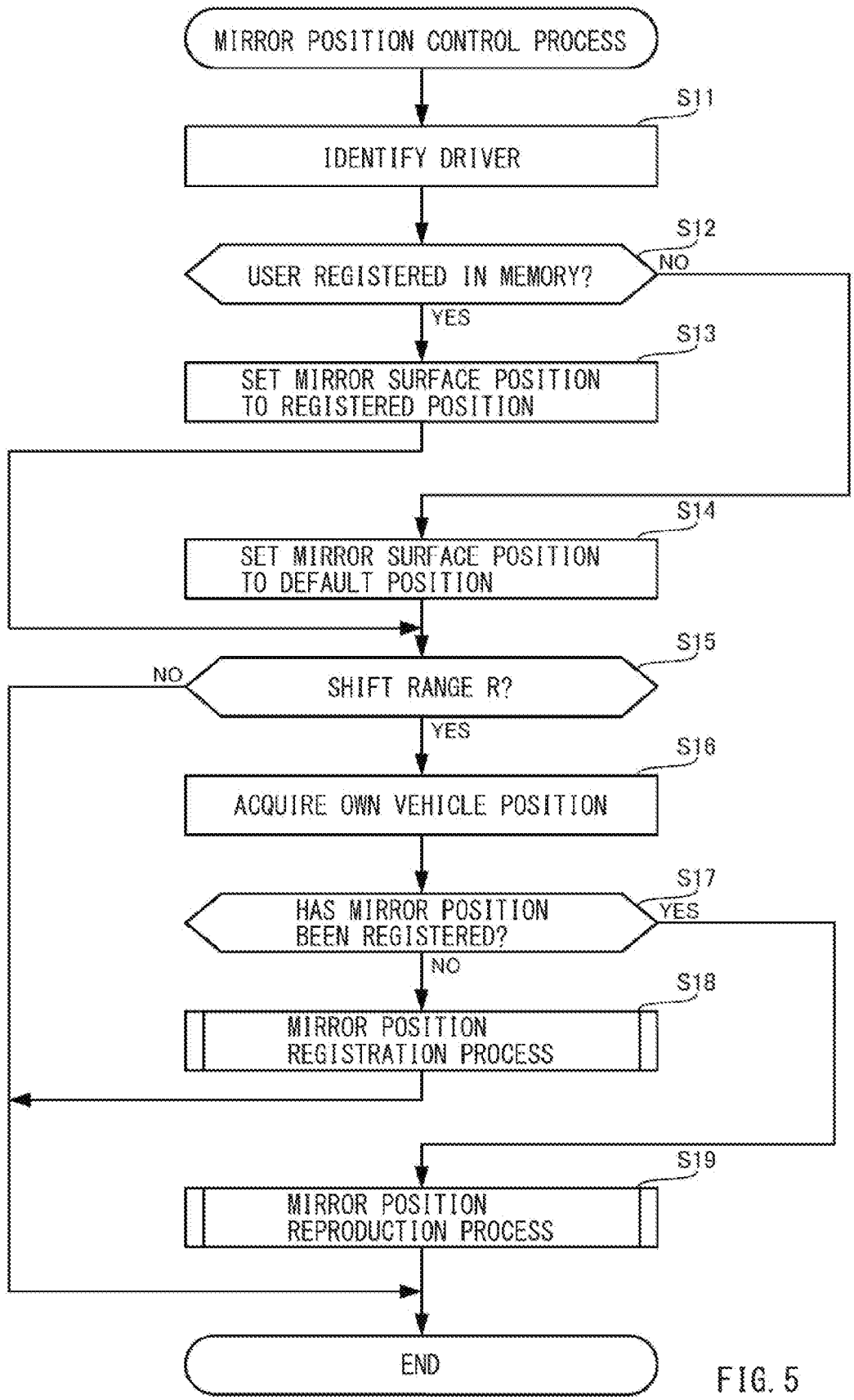
FIG. 5 is a flowchart of a mirror position control process performed by the mirror position registration control apparatus.

Hereinafter, the mirror position control process performed by the CPU of the processor 110 is described with reference to FIG. 5.

In a case where an occupant gets into the vehicle 1 after an operation of opening a door, the CPU of the processor 110 may begin the mirror position control process. In a case where the mirror position control process is begun, the process of identifying the driver H may be performed in Step S11. For example, the CPU of the processor 110 may acquire identification information regarding the driver H. The driver H may be recognized by using the face recognition function of the vehicle compartment occupant monitoring system. After the driver H is identified, the process may transition to Step S12.

In Step S12, the CPU of the processor 110 may perform a process of determining whether or not the driver H is a user registered in a memory. In one example, the CPU of the processor 110 may determine whether or not the driver H identified above is a user registered by using user registration information registered and stored, for example, in the RAM or the EEPROM of the processor 110. In a case where the RAM of the processor 110 stores the user registration information, the RAM of the processor 110 may remain supplied with power even after the ignition is turned off. This prevents what is stored in the RAM of the processor 110 from being lost. In a case where the driver H is a user registered in the memory, information regarding the registered user may be stored in the RAM.

In a case where the CPU of the processor 110 determines that the driver H is a user registered in the memory (Step S12: YES), the process may transition to Step S13. In a case where the CPU of the processor 110 determines that the driver H is not a user registered in the memory (Step S12: NO), the process may transition to Step S14.

In Step S13, the CPU of the processor 110 may perform a process of setting a mirror surface position to a registered position. In one example, the CPU of the processor 110 may read each of pieces of mirror surface position information for normal traveling stored in the mirror surface position storage 120 on the basis of the registered user described above. As described above, the mirror surface position storage 120 may store, for each of registered users, mirror surface position information regarding the respective mirrors for normal traveling, normal reverse traveling, and reverse traveling in specific places. The CPU of the processor 110 may drive the mirror driver 60 to set the respective mirror surface positions of the door mirrors 11L and 11R, the rear-view mirror 12, and the rear camera 13 on the basis of the respective pieces of read mirror surface position information. After the CPU of the processor 110 sets the mirror surface positions to the registered positions, the process may transition to Step S15.

In Step S14, the CPU of the processor 110 may perform a process of setting a mirror surface position to a default position or an initial setting position. In one example, the CPU of the processor 110 may read the default position of each of the mirror surface positions from the mirror surface position storage 120. On the basis of the respective default positions of the read mirror surface positions, the CPU of the processor 110 may drive the mirror driver 60 to set the respective mirror surface positions of the door mirrors 11L and 11R, the rear-view mirror 12, and the rear camera 13 to the default positions. After the CPU of the processor 110 sets the mirror surface positions to the default positions, the process may transition to Step S15.

In Step S15, the CPU of the processor 110 may perform a process of determining whether or not the shift range is the reverse range R. In one example, the CPU of the processor 110 may determine whether or not the shift range received by the shift position sensor 50 is the reverse range R. In a case where the CPU of the processor 110 determines that the shift range is the reverse range R (Step S15: YES), the process may transition to Step S16. In a case where the CPU of the processor 110 determines that the shift range is not the reverse range R (Step S15: NO), the mirror position control process may be suspended. The shift range may be monitored, for example, after the ignition is turned on. In a case where the shift range is set at the reverse range R, the mirror position control process may be started again to execute the process from Step S16.

In Step S16, the CPU of the processor 110 may perform a process of acquiring the own vehicle position. In one example, the CPU of the processor 110 may acquire own vehicle position information from the own vehicle position detector 80 and identify the current position of the vehicle 1. After the CPU of the processor 110 acquires the own vehicle position, the process may transition to Step S17.

In Step S17, the CPU of the processor 110 may perform a process of determining whether or not the own vehicle position is a position for which a mirror position has been registered. In one example, the CPU of the processor 110 may determine whether or not the acquired own vehicle position information indicating the current position of the vehicle 1 is a registered position of a registered user stored in the mirror surface position storage 120. For example, the CPU of the processor 110 may determine that the current position of the vehicle 1 is a position for which a mirror position has been registered in a case where the current position of the vehicle 1 is the position of the house or the supermarket for which the driver H has already registered a specific mirror surface position in the mirror surface position storage 120. In a case where the CPU of the processor 110 determines that the current position of the vehicle 1 is a position for which a mirror position has been registered on the basis of the acquired own vehicle position information (Step S17: YES), the process may transition to Step S19. In a case where the CPU of the processor 110 determines that the current position of the vehicle 1 is not a position for which a mirror position has been registered (Step S17: NO), the process may transition to Step S18.

In Step S18, the CPU of the processor 110 may perform a mirror position registration process. In the mirror position registration process, the CPU of the processor 110 may perform a process of registering a mirror surface position for each of places in which reverse traveling is to be taken place. The mirror position registration process is described in detail below. After the mirror position registration process is finished, the mirror position control process may be finished.

In Step S19, the CPU of the processor 110 may perform a mirror position reproduction process. In the mirror position reproduction process, the CPU of the processor 110 may perform a process of moving each of mirrors to a mirror surface position set for reverse traveling. The mirror position reproduction process is described in detail below. After the mirror position reproduction process is finished, the mirror position control process may be finished.

Figure 6:
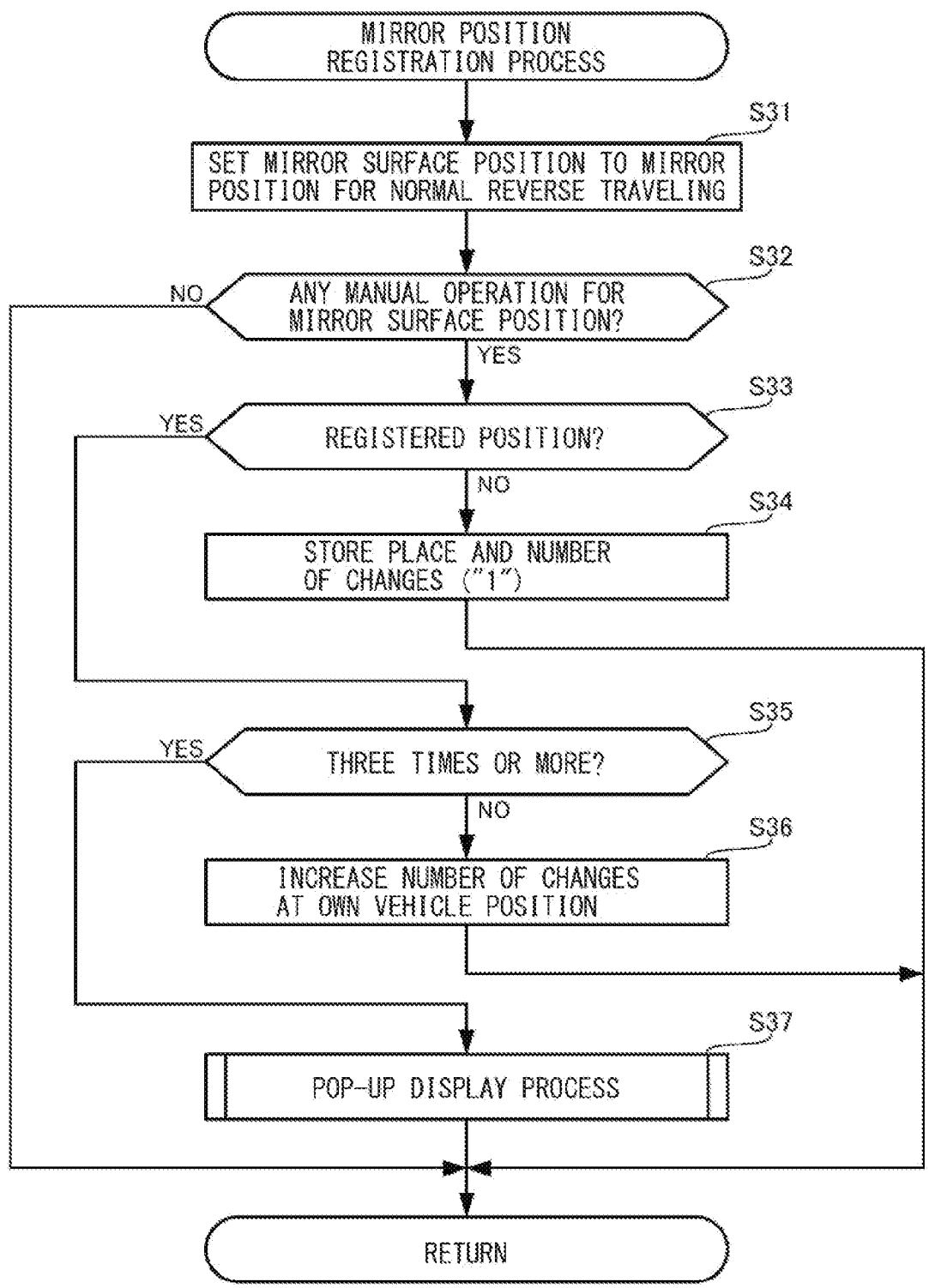
FIG. 6 is a flowchart of a mirror position registration process performed by the mirror position registration control apparatus.

Next, the mirror position registration process performed by the CPU of the processor 110 is described with reference to FIG. 6. FIG. 6 illustrates a subroutine for Step S18 or the mirror position registration process in FIG. 5.

In the mirror position registration process, first, in Step S31, the CPU of the processor 110 may perform a process of setting a mirror surface position to a mirror surface position for normal reverse traveling. In one example, the CPU of the processor 110 may read a mirror surface position for normal reverse traveling stored in the mirror surface position storage 120. In other words, the CPU of the processor 110 may read a default or initial setting mirror surface position for reverse traveling. The CPU of the processor 110 may then drive the mirror driver 60 to set the respective mirror surface positions of the door mirrors 11L and 11R, the rear-view mirror 12, and the rear camera 13 by using the read default values of the mirror surface positions for reverse traveling. The mirror surface position for normal reverse traveling may be registered when a user is registered. In a case where the mirror surface position for normal reverse traveling is not registered, the CPU of the processor 110 may refrain from changing the mirror surface position. After the CPU of the processor 110 sets a mirror surface position to the mirror surface position for normal reverse traveling, the process may transition to Step S32.

In Step S32, the CPU of the processor 110 may determine whether or not a manual operation is performed for a mirror surface position. In one example, the CPU of the processor 110 may determine whether or not the driver H changes the mirror surface position of the door mirror 11L or 11R, the rear-view mirror 12, or the rear camera 13 by performing a manual operation with the door mirror operation switch 20. In other words, the CPU of the processor 110 may determine whether or not a mirror surface position is manually changed by the driver H rather than being automatically set to a mirror surface position stored in the mirror surface position storage 120.

In a case where the CPU of the processor 110 determines that a manual operation is performed for a mirror surface position (Step S32: YES), the process may transition to Step S33. In a case where the CPU of the processor 110 determines that no manual operation is performed for a mirror surface position (Step S32: NO), the mirror position registration process may be finished.

In Step S33, the CPU of the processor 110 may determine whether or not the current position is a stored position. In one example, the CPU of the processor 110 may determine whether or not the current position of the vehicle 1 received by the own vehicle position detector 80 matches a registration candidate position stored in the mirror surface position storage 120. The storage area of the registration candidate position may be, for example, the RAM or the EEPROM of the processor 110.

In a case where the CPU of the processor 110 determines that the current position is a stored position or a registration candidate position (Step S33: YES), the process may transition to Step S35. In a case where the CPU of the processor 110 determines that the current position is not a stored position or a registration candidate position (Step S33: NO), the process may transition to Step S34.

In Step S34, the CPU of the processor 110 may perform a process of storing the place and the number of changes in mirror surface position. In one example, the CPU of the processor 110 may store the current position as a registration candidate position and the number of changes in the mirror surface position as "1" in the mirror surface position storage 120.

The storage area of the registration candidate position may be, for example, the RAM or the EEPROM of the processor 110 as described above. In other words, in the above-described process (Step S33) of determining whether or not the current position is a stored position, the storage area in which a registration candidate position is to be stored in this candidate position registration process may be searched to determine whether or not the current position is a stored position.

The CPU of the processor 110 may store not only a registration candidate position and the number of changes in mirror surface position, but also the date and time of the storage. Storing the date and time in this way makes it possible to clear the number of times a registration candidate position and the number of changes in mirror surface position are stored after an elapse of a predetermined time or a longer time. This makes it possible to limit the number of changes in mirror surface position to the number of changes in mirror surface position within a predetermined period in the process of determining whether or not a mirror surface position has been changed three times or more (the process Step S35 described below). For example, in a case where two weeks or more has passed since the last storage, the number of changes in mirror surface position may be set to "1". This makes it possible to display a registration screen for a place in which no manual operation has been performed for a mirror for a long period.

After the CPU of the processor 110 performs the process of storing a place and the number of changes in mirror surface position, the CPU of the processor 110 may finish the mirror position registration process.

In Step S35, the CPU of the processor 110 may determine whether or not the mirror surface has been changed three times or more at the position. In one example, the CPU of the processor 110 may determine whether or not the number of changes in mirror surface position at the current position stored in the mirror surface position storage 120 as a registration candidate position is already two or more. In a case where the number of changes in mirror surface position is two or more, the total number of changes in mirror surface position may amount to three or more including the change in mirror surface position this time. The CPU of the processor 110 may thus determine that a mirror surface is changed three times or more at the position.

In a case where the CPU of the processor 110 determines that the mirror surface has been changed three times or more at the position (Step S35: YES), the process may transition to Step S37. In a case where the CPU of the processor 110 determines that the mirror surface has not been changed three times or more at the position (Step S35: NO), the process may transition to Step S36.

In Step S36, the CPU of the processor 110 may perform a process of increasing the number of changes in mirror surface position at the own vehicle position. In one example, the CPU of the processor 110 may perform a process of adding "1" to the number of changes in mirror surface position at the current position stored in the mirror surface position storage 120 as a registration candidate position. After the CPU of the processor 110 performs the process of increasing the number of changes in mirror surface position at the own vehicle position, the CPU of the processor 110 may finish the mirror position registration process.

In Step S37, the CPU of the processor 110 may perform a pop-up display process. In the pop-up display process, the CPU of the processor 110 may perform, for example, a process of displaying guidance or a pop-up to prompt the driver H to register a mirror surface position, and a registration process. The pop-up display process is described in detail below. After the pop-up display process is finished, the mirror position registration process may be finished.

Figure 7:
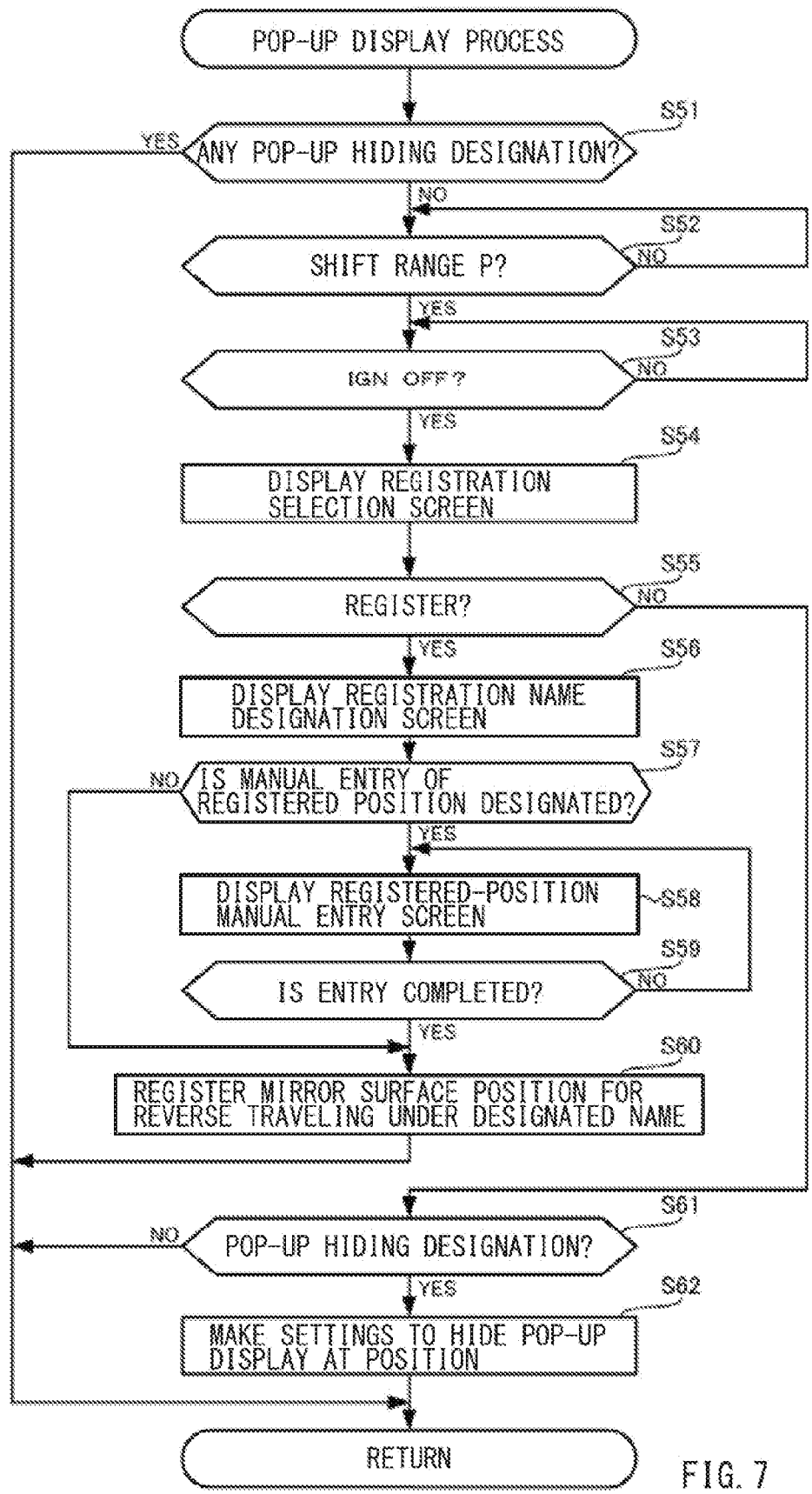
FIG. 7 is a flowchart of a pop-up display process performed by the mirror position registration control apparatus.

Next, the pop-up display process performed by the CPU of the processor 110 is described with reference to FIG. 7. FIG. 7 illustrates a subroutine for Step S37 or the pop-up display process in FIG. 6.

In the pop-up display process, first, in Step S51, the CPU of the processor 110 may perform a process of determining whether or not pop-up hiding designation is set. In one example, the CPU of the processor 110 may determine whether or not pop-up hiding designation is set for the data regarding the registration candidate position of the current position and the number of changes in mirror surface position stored in the mirror surface position storage 120. For example, the CPU of the processor 110 may determine whether the pop-up hiding designation flag is on or off. In a case where the CPU of the processor 110 determines that pop-up hiding designation is set (Step S51: YES), the pop-up display process may be finished. In a case where the CPU of the processor 110 determines that no pop-up hiding designation is set (Step S51: NO), the process may transition to Step S52.

In Step S52, the CPU of the processor 110 may perform a process of determining whether or not the shift range is the parking range P. In one example, the CPU of the processor 110 may determine whether or not the shift range received by the shift position sensor 50 is the parking range P. In other words, the CPU of the processor 110 may determine whether or not the shift range is changed from the reverse range R to the parking range P. In a case where the CPU of the processor 110 determines that the shift range is the parking range P (Step S52: YES), the process may transition to Step S53. In a case where the CPU of the processor 110 determines that the shift range is not the parking range P (Step S52: NO), the process may return to Step S52, and Step S52 may be repeated until the shift range is set to the parking range P.

In Step S53, the CPU of the processor 110 may perform a process of determining whether or not the ignition is turned off. In a case where the CPU of the processor 110 determines that the ignition is turned off (Step S53: YES), the process may transition to Step S54. In a case where the CPU of the processor 110 determines that the ignition is not turned off (Step S53: NO), the process may return to Step S53, and Step S53 may be repeated until the ignition is turned off.

Figure 8:
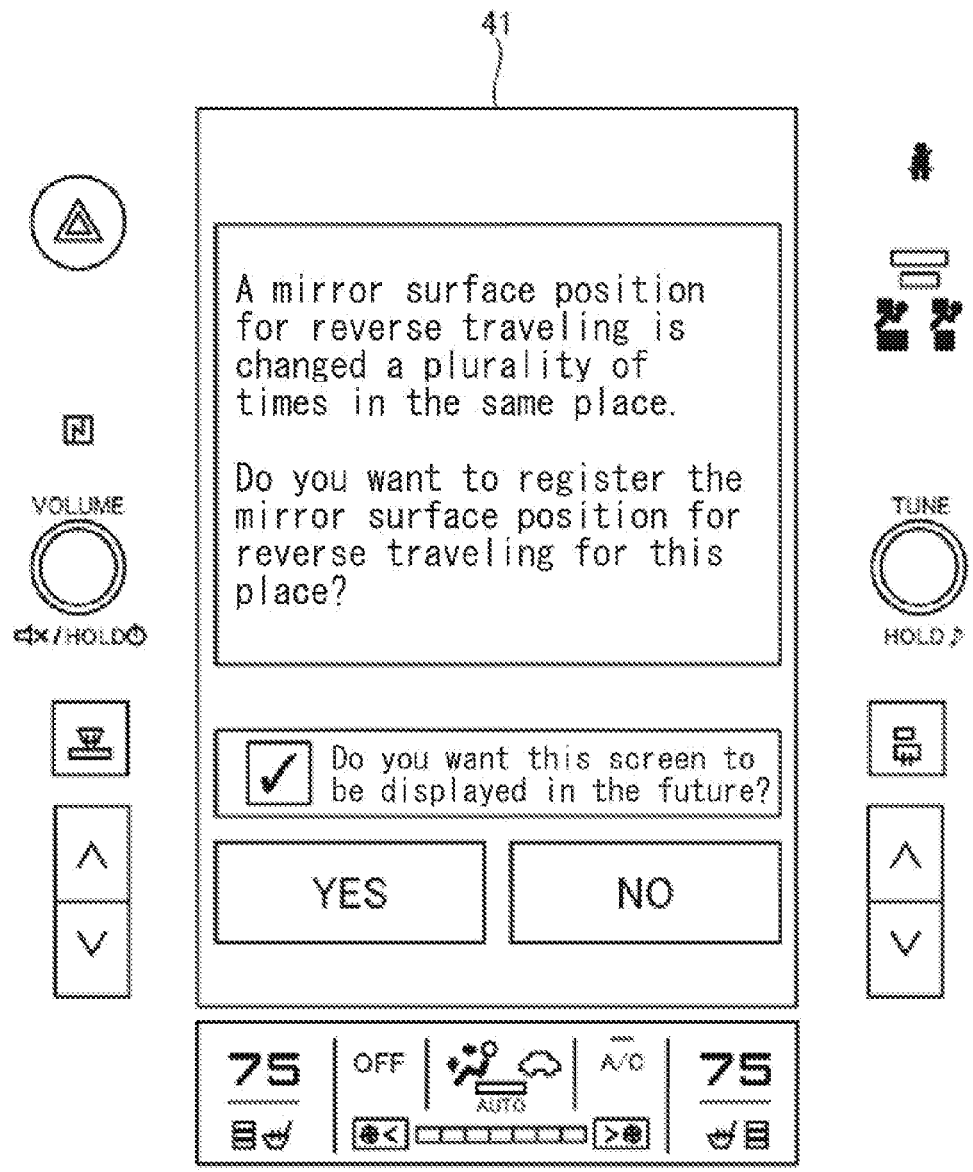
FIG. 8 is a display screen example illustrating a registration selection screen for a mirror surface position.

In Step S54, the CPU of the processor 110 may perform a registration selection screen display process. In one example, the CPU of the processor 110 may perform a process of displaying a screen on the middle information display panel 41 to ask the driver H to select whether or not to register a mirror surface position for reverse traveling for the current position. FIG. 8 illustrates a display example of the registration selection screen for a mirror surface position. As illustrated in FIG. 8, the CPU of the processor 110 may ask the driver H in the registration selection screen for a mirror surface position to determine whether or not to register a mirror surface position for the current position (YES or NO). In a case where the driver H does not register a mirror surface position for the current position, the CPU of the processor 110 may also ask the driver H to determine whether or not the driver H wishes this registration selection screen for the mirror surface position for the current position to be displayed in the further. For example, the box may be checked to display the screen in the future as a preset value. In a case where the screen is not going to be displayed next time or later, the box may be unchecked. After the CPU of the processor 110 displays the registration selection screen and a predetermined item is selected, the process may transition to Step S55.

In Step S55, the CPU of the processor 110 may perform a process of determining whether or not "register" is selected. In one example, the CPU of the processor 110 may determine whether to "register" or to "refuse to register" a mirror surface position for the current position is selected from the middle information display panel 41. The middle information display panel 41 may be a touch panel that displays a registration selection screen. To "register" a mirror surface position for the current position may be represented, for example, by "YES". To "refuse to register" a mirror surface position for the current position may be represented, for example, by "NO". In a case where the CPU of the processor 110 determines that "register" is selected (Step S55: YES), the process may transition to Step S56. In a case where the CPU of the processor 110 determines that "refuse to register" is selected (Step S55: NO), the process may transition to Step S61.

In a case where a predetermined input operation such as a registration operation is not performed in spite of an elapse of a predetermined time after the registration selection screen is displayed, the CPU of the processor 110 may hide the registration selection screen and finish the pop-up display process to finish the mirror position control process.

Figure 9:
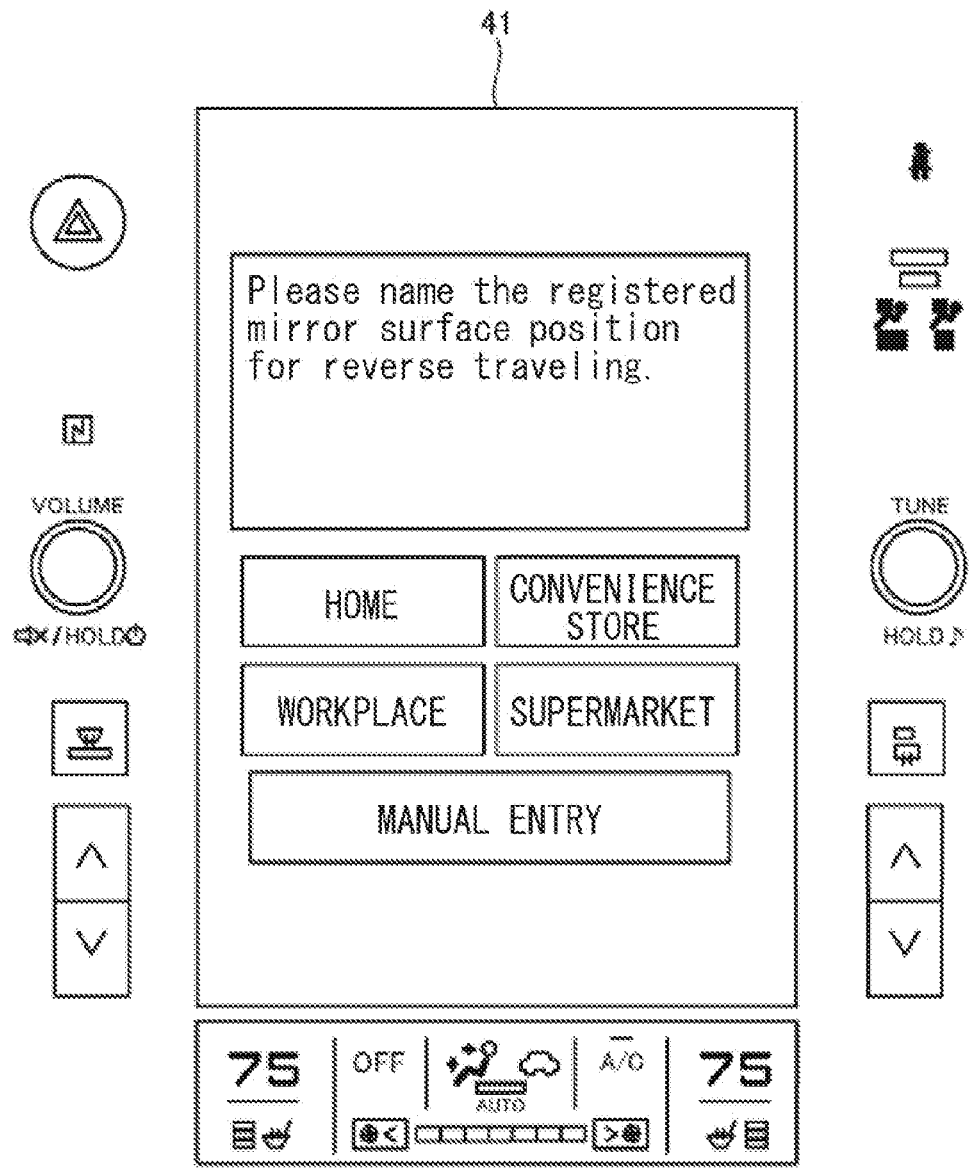
FIG. 9 is a display screen example illustrating a registration name designation screen.

In Step S56, the CPU of the processor 110 may perform a registration name designation screen display process. In one example, the CPU of the processor 110 may perform a process of display, on the middle information display panel 41, a display screen in which a registration name to be used to register a mirror surface position is designated. FIG. 9 illustrates a display example of the registration name designation screen. As illustrated in FIG. 9, a plurality of preset values and manual entry are prepared in the registration name designation screen. The plurality of preset values may include home, convenience store, workplace, and supermarket. The manual entry may allow the driver H to freely enter a registration name. The driver H may select any of the preset values or the manual entry from this registration name designation screen. After the CPU of the processor 110 displays the registration name designation screen and a predetermined item is selected, the process may transition to Step S57.

In Step S57, the CPU of the processor 110 may perform a process of determining whether or not the manual entry of a registered position is designated. In one example, the CPU of the processor 110 may determine whether or not the manual entry is selected from the middle information display panel 41 displaying the registration name designation screen. The manual entry may allow a registration name to be manually entered. In other words, the CPU of the processor 110 may determine whether any of the preset values or the manual entry is selected from the registration name designation screen. In a case where the CPU of the processor 110 determines that the manual entry of a registered position is designated (Step S57: YES), the process may transition to Step S58. In a case where the CPU of the processor 110 determines that the manual entry of a registered position is not designated (Step S57: NO), the process may transition to Step S60. In other words, in a case where the CPU of the processor 110 determines that any of the preset values is selected, the process may transition to Step S60.

In Step S58, the CPU of the processor 110 may perform a registered-position manual entry screen display process. In one example, the CPU of the processor 110 may perform a process of display, on the middle information display panel 41, a screen for allowing the driver H to enter a registration name for registering a mirror surface position. After the CPU of the processor 110 displays the registered-position manual entry screen, the process may transition to Step S59.

In Step S59, the CPU of the processor 110 may perform a process of determining whether or not the entry of a registration name is completed. In one example, the CPU of the processor 110 may determine whether or not a registration name is entered from the middle information display panel 41 displaying the registered-position manual entry screen and whether or not, for example, the completion of entry is selected. In a case where the CPU of the processor 110 determines that the entry of a registration name is completed (Step S59: YES), the process may transition to Step S60. In a case where the CPU of the processor 110 determines that the entry of a registration name is not completed (Step S59: NO), the process may transition to Step S58.

In Step S60, the CPU of the processor 110 may perform a process of registering a mirror surface position for reverse traveling under a designated name. In one example, in a case where a registration name is manually entered as described above, the CPU of the processor 110 may register the mirror surface position currently set for the position in the mirror surface position storage 120 under the manually entered registration name. In contrast, in a case where any of the preset values is selected from the registration name designation screen, the CPU of the processor 110 may register the mirror surface position in the mirror surface position storage 120 under the registration name of the preset value. After the CPU of the processor 110 finishes registering the mirror surface position, the pop-up display process may be finished.

In Step S61, the CPU of the processor 110 may perform a process of determining whether or not pop-up hiding designation is selected. In one example, the CPU of the processor 110 may determine whether or not the refusal of future pop-up display is selected from the middle information display panel 41. In a case where the CPU of the processor 110 determines that pop-up hiding designation is selected (Step S61: YES), the process may transition to Step S62. In a case where the CPU of the processor 110 determines that no pop-up hiding designation is selected (Step S62: NO), the pop-up display process may be finished.

In Step S62, the CPU of the processor 110 may perform a process of making settings to hide pop-up display at the position. In one example, the CPU of the processor 110 may set the pop-up hiding designation for a registration candidate position of the current position stored in the mirror surface position storage 120. For example, a pop-up hiding flag may be turned on for the registration candidate position of the current position to prevent the pop-up display from appearing at the position next time or later. That is, the pop-up display process may be finished with no display process performed in Step S51. After the CPU of the processor 110 makes the settings to hide pop-up display at the position, the pop-up display process may be finished.

Figure 10:
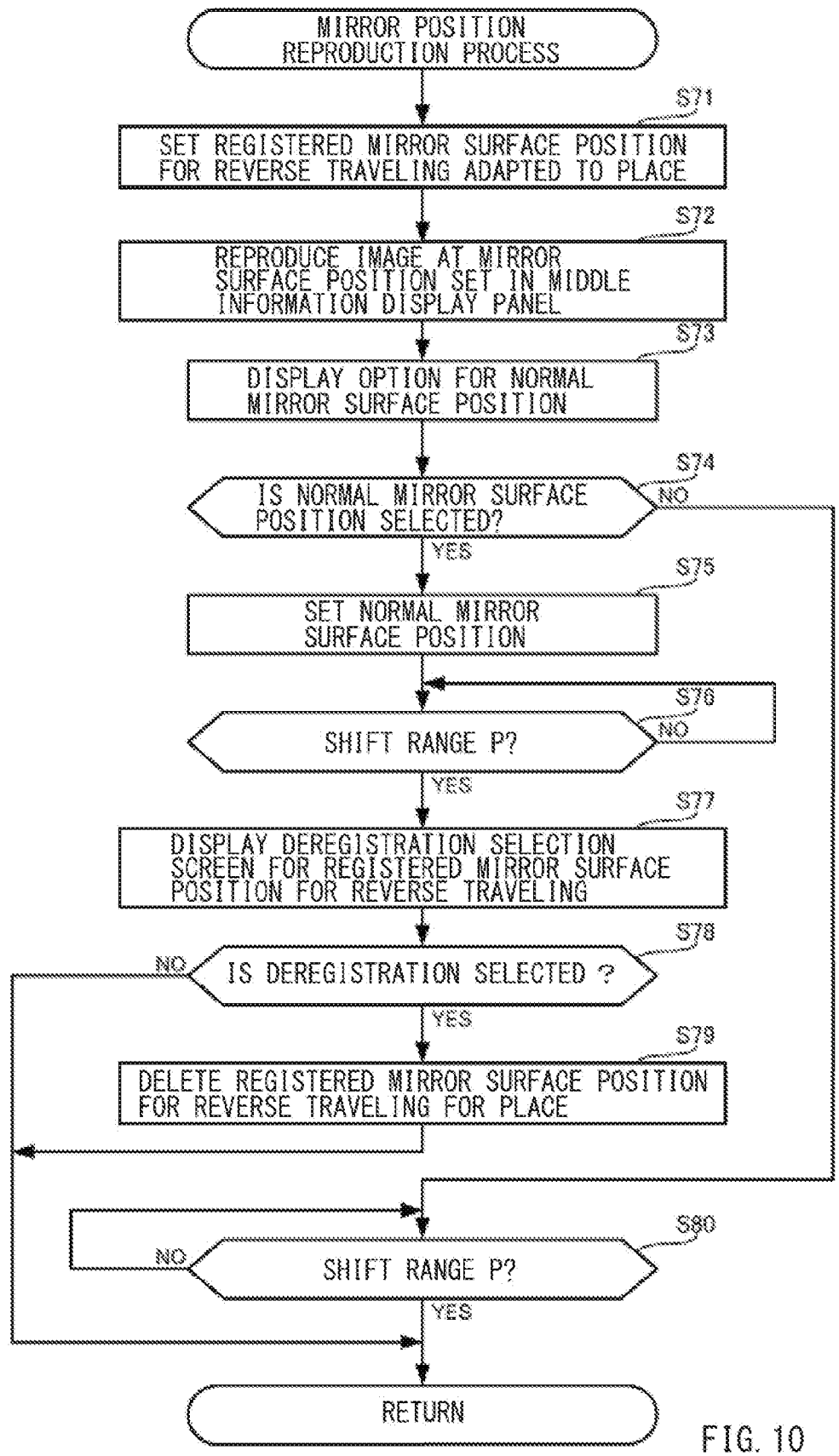
FIG. 10 is a flowchart of a mirror position reproduction process performed by the mirror position registration control apparatus.

Next, the mirror position reproduction process performed by the CPU of the processor 110 is described with reference to FIG. 10. FIG. 10 illustrates a subroutine for Step S19 or the mirror position reproduction process in FIG. 5.

In the mirror position reproduction process, first, in Step S71, the CPU of the processor 110 may perform a process of setting a registered mirror surface position for reverse traveling adapted to a place. In one example, the CPU of the processor 110 may read a mirror surface position for reverse traveling for the own vehicle position detected by the own vehicle position detector 80 from the mirror surface position storage 120. The CPU of the processor 110 may drive the mirror driver 60 to set the mirror surface position of the door mirror 11L or 11R, the rear-view mirror 12, or the rear camera 13. After the CPU of the processor 110 sets the mirror surface position for reverse traveling, the process may transition to Step S72.

In Step S72, the CPU of the processor 110 may perform a process of reproducing an image at a mirror surface position on the middle information display panel 41. In one example, the CPU of the processor 110 may perform a process of displaying, on the middle information display panel 41, an image captured by the rear camera 13 whose mirror surface position has been changed. The mirror surface position may include the imaging position and angle of the rear camera 13 for imaging. The image displayed on the middle information display panel 41 may be a moving image. After the CPU of the processor 110 reproduces an image at the mirror surface position, the process may transition to Step S73.

Figure 11:
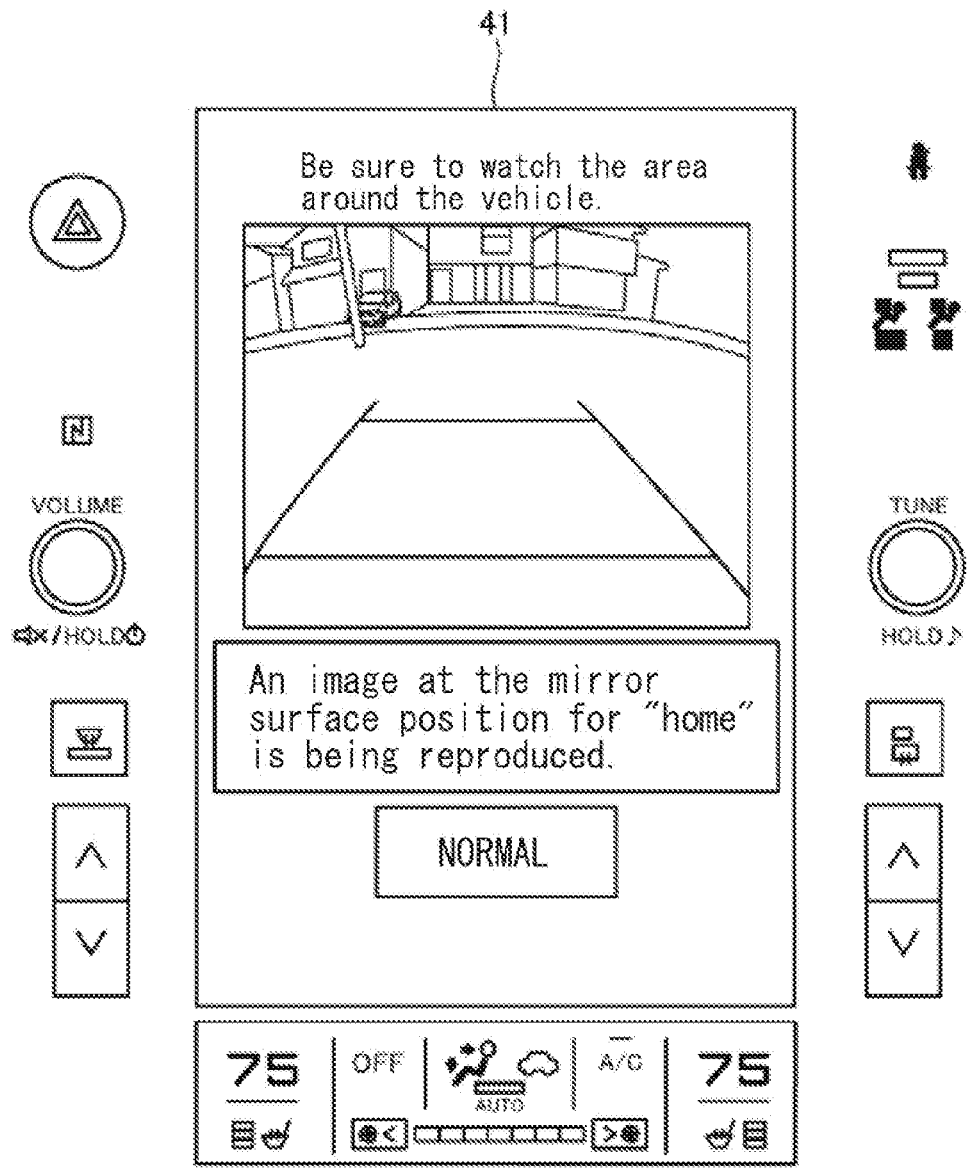
FIG. 11 is a display screen example illustrating a rear image and an option display screen that are displayed on a middle information display panel.

In Step S73, the CPU of the processor 110 may perform a process of displaying an option for a normal mirror surface position for reverse traveling. In one example, the CPU of the processor 110 may perform a process of causing the middle information display panel 41 to display an option for a normal mirror surface position for reverse traveling. FIG. 11 illustrates examples of a rear image and an option display screen displayed on the middle information display panel 41. The rear image may be an image captured by the rear camera 13. The option display screen may be a display screen for the option. As illustrated in FIG. 11, the CPU of the processor 110 may display, on the middle information display panel 41, an image being reproduced on the basis of the mirror surface position for the designated place. In addition, the CPU of the processor 110 may display an option for a normal mirror surface position for reverse traveling. After the CPU of the processor 110 displays the option for the normal mirror surface position for reverse traveling, the process may transition to Step S74.

In Step S74, the CPU of the processor 110 may perform a process of determining whether or not the normal mirror surface position is selected. In one example, the CPU of the processor 110 may determine whether or not display at the normal mirror surface position is selected from the middle information display panel 41 displaying a rear image and an option display screen. In other words, the CPU of the processor 110 may determine whether or not an option to be set for the normal mirror surface position is selected from the rear image and the option display screen. In a case where the CPU of the processor 110 determines that the normal mirror surface position is selected (Step S74: YES), the process may transition to Step S75. In a case where the CPU of the processor 110 determines that the normal mirror surface position is not selected (Step S74: NO), the process may transition to Step S80.

In Step S75, the CPU of the processor 110 may perform a process of setting a mirror surface position to the normal mirror surface position. In one example, the CPU of the processor 110 may read a default mirror surface position or an initial setting value for reverse traveling stored in the mirror surface position storage 120. The CPU of the processor 110 may then drive the mirror driver 60 to set the respective mirror surface positions of the door mirrors 11L and 11R, the rear-view mirror 12, and the rear camera 13 by using the read default values of the mirror surface positions for reverse traveling. After the CPU of the processor 110 sets the mirror surface position to the normal mirror surface position for reverse traveling, the process may transition to Step S76.

In Step S76, the CPU of the processor 110 may perform a process of determining whether or not the shift range is the parking range P. In one example, the CPU of the processor 110 may determine whether or not the shift range received by the shift position sensor 50 is the parking range P. In other words, the CPU of the processor 110 may determine whether or not the shift range is changed from the reverse range R to the parking range P. In a case where the CPU of the processor 110 determines that the shift range is the parking range P (Step S76: YES), the process may transition to Step S77. In a case where the CPU of the processor 110 determines that the shift range is not the parking range P (Step S76: NO), the process may return to Step S76, and Step S76 may be repeated until the shift range is set to the parking range P.

In Step S77, the CPU of the processor 110 may perform a process of displaying a deregistration selection screen for a registered mirror surface position for reverse traveling. In one example, the CPU of the processor 110 may perform a process of displaying a deregistration selection screen on the middle information display panel 41. The deregistration selection screen may prompt the driver H to select whether or not to delete the registered mirror surface position for reverse traveling. After the CPU of the processor 110 displays the deregistration selection screen for a registered mirror surface position for reverse traveling, the process may transition to Step S78.

In Step S78, the CPU of the processor 110 may perform a process of determining whether or not "deregister" is selected. In one example, the CPU of the processor 110 may determine whether or not the option to delete the registered mirror surface position for reverse traveling is selected from the middle information display panel 41. Alternatively, the CPU of the processor 110 may perform a process of determining whether or not "refuse to deregister" is selected. In a case where the CPU of the processor 110 determines that "deregister" is selected (Step S78: YES), the process may transition to Step S79. In a case where the CPU of the processor 110 determines that "refuse to deregister" is selected (Step S78: NO), the mirror position reproduction process may be finished. In a case where nothing is inputted in spite of an elapse of a predetermined time after the deregistration selection screen is displayed, the display of the deregistration selection screen may be finished to finish the mirror position reproduction process.

In Step S79, the CPU of the processor 110 may perform a process of deregistering the registered mirror surface position for reverse traveling for the place. In one example, the CPU of the processor 110 may delete information regarding the mirror surface position for the position currently set in the mirror surface position storage 120. After the CPU of the processor 110 finishes deregistering the mirror surface position, the mirror position reproduction process may be finished.

In Step S80, the CPU of the processor 110 may perform a process of determining whether or not the shift range is the parking range P. In one example, the CPU of the processor 110 may determine whether or not the shift range received by the shift position sensor 50 is the parking range P. In other words, the CPU of the processor 110 may determine whether or not the shift range is changed from the reverse range R to the parking range P. In a case where the CPU of the processor 110 determines that the shift range is the parking range P (Step S80: YES), the mirror position reproduction process may be finished. In a case where the CPU of the processor 110 determines that the shift range is not the parking range P (Step S80: NO), the process may return to Step S80, and Step S80 may be repeated until the shift range is set to the parking range P.

In a case where a manual operation is performed for the mirror surface position in the mirror position reproduction process, the pop-up display process may be performed to make it possible to prompt the driver H to register a new mirror surface position, for example, by displaying the registration selection screen.

As described above, in a case where a mirror surface position is changed with the shift position set at the shift position for reverse traveling, the mirror position registration control apparatus 100 displays a registration screen for the changed mirror surface position on the middle information display panel 41 when the shift position is changed from the reverse position R to the parking position P. In a case where the driver H performs an easy registration operation, the mirror position registration control apparatus 100 stores the changed mirror surface position in the mirror surface position storage 120. This makes it possible to increase the convenience of adjusting a mirror position without requesting any complicated work whenever the mirror position is adjusted.

For example, a program stored in the ROM, the RAM, or the EEPROM of the processor 110 may be developed in the RAM of the processor 110, causing the CPU of the processor 110 to execute the mirror position registration control process according to the example embodiment.

In the example embodiment, the shift position sensor 50 may be included in the shift position detector according to the technology. Further, in the example embodiment, the middle information display panel 41 may be included in the information display and the registration operation receiver according to the technology.

The processor 110 in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 110.

The invention claimed is:

1. An automatic mirror position registration control apparatus to be applied to a vehicle, the mirror position registration control apparatus comprising:
   a shift position detector comprising a shift position sensor configured to detect a shift position of the vehicle;
   a mirror surface position storage configured to store a set mirror surface position;
   an information display configured to display information for a driver who drives the vehicle;
   a registration operation receiver configured to receive a registration operation for the mirror surface position from the information display, the registration operation being inputted by the driver via the information display; and
   a processor configured to,
      detect a change in a mirror surface position in the vehicle automatically based on a signal indicating the change in the mirror surface position or a changing instruction received from the information display, the changing instruction indicating a change to a rear camera of the vehicle that input by the driver into the information display;
      receive a detection signal indicating the detected shift position from the shift position sensor and determine the shift position of the vehicle automatically based on the detected shift position indicated in the received detection signal;

in response to the mirror surface position being changed with the shift position set at a reverse position, determine whether the shift position of the vehicle is changed from the reverse position to a parking position based on a detection of the shift position sensor;

in response to determining that the shift position of the vehicle is changed from the reverse position to the parking position, display a registration screen for the detected change in the mirror surface position on the information display after the shift position is changed from the reverse position to the parking position; and store the changed mirror surface position in the mirror surface position storage on a basis of the registration operation after the shift position is changed from the reverse position to the parking position.

2. The mirror position registration control apparatus according to claim 1, further comprising a vehicle position detector configured to detect a position of the vehicle, wherein the processor is configured to store the changed mirror surface position in the mirror surface position storage for each of places of the vehicle, the places being each based on the position detected by the vehicle position detector.

3. The mirror position registration control apparatus according to claim 2, wherein the processor is configured to display the registration screen in a case where the mirror surface position is changed a predetermined number of times or more in a predetermined place.

4. The mirror position registration control apparatus according to claim 1, wherein the processor is configured to, in a case where a predetermined time passes with no registration operation performed after the registration screen is displayed, hide the displayed registration screen.

5. The mirror position registration control apparatus according to claim 2, wherein the processor is configured to, in a case where a predetermined time passes with no registration operation performed after the registration screen is displayed, hide the displayed registration screen.

6. The mirror position registration control apparatus according to claim 3, wherein the processor is configured to, in a case where a predetermined time passes with no registration operation performed after the registration screen is displayed, hide the displayed registration screen.

7. The mirror position registration control apparatus according to claim 1, wherein the processor is configured to display the registration screen when an ignition is turned off after the shift position is changed from the reverse position to the parking position.

8. The mirror position registration control apparatus according to claim 2, wherein the processor is configured to display the registration screen when an ignition is turned off after the shift position is changed from the reverse position to the parking position.

9. The mirror position registration control apparatus according to claim 3, wherein the processor is configured to display the registration screen when an ignition is turned off after the shift position is changed from the reverse position to the parking position.

10. The mirror position registration control apparatus according to claim 4, wherein the processor is configured to display the registration screen when an ignition is turned off after the shift position is changed from the reverse position to the parking position.

11. The mirror position registration control apparatus according to claim 5, wherein the processor is configured to display the registration screen when an ignition is turned off after the shift position is changed from the reverse position to the parking position.

12. The mirror position registration control apparatus according to claim 6, wherein the processor is configured to display the registration screen when an ignition is turned off after the shift position is changed from the reverse position to the parking position.

13. The mirror position registration control apparatus according to claim 2, wherein the vehicle position detector further comprises a GPS receiver configured to detect the position of the vehicle.

14. The mirror position registration control apparatus according to claim 2, wherein the processor is configured to, in response to determining that one of the places of the vehicle is not a stored position or a registration candidate position in the mirror surface position storage, store the one of the places of the vehicle as the registration candidate position and a number of changes in the mirror surface position for the one of the places as one in the mirror surface position storage.

15. The mirror position registration control apparatus according to claim 3, wherein the predetermined place is a stored position or a registration candidate position in the mirror surface position storage.

16. The mirror position registration control apparatus according to claim 3, wherein the processor is configured to:

in response to determining that the mirror surface position is changed less than the predetermined number of times in the predetermined place, increase a number of changes in the predetermined place by one, the predetermined place being stored as a registration candidate position in the mirror surface position storage.

* * * * *